(12) United States Patent
Lam et al.

(10) Patent No.: US 7,159,677 B1
(45) Date of Patent: Jan. 9, 2007

(54) COMPACT DRIVE MECHANISM FOR ELECTRICALLY POWERED VEHICLE

(75) Inventors: Philip H. L. Lam, Toronto (CA); Vincent K. W. Lam, Toronto (CA)

(73) Assignee: CCL Industrial Motor Limited, Fanling (HK)

( * ) Notice: Subject to any disclaimer, the term of this patent is extended or adjusted under 35 U.S.C. 154(b) by 295 days.

(21) Appl. No.: 10/970,941

(22) Filed: Oct. 22, 2004

(51) Int. Cl.
*B60K 1/00* (2006.01)

(52) U.S. Cl. .................................................. 180/65.5

(58) Field of Classification Search ............... 180/65.5, 180/65.1, 65.6, 907, 181
See application file for complete search history.

(56) References Cited

U.S. PATENT DOCUMENTS

| | | | | |
|---|---|---|---|---|
| 2,039,513 A | * | 5/1936 | Baker .......................... | 180/65.5 |
| 2,923,365 A | * | 2/1960 | McKechnie ................... | 180/11 |
| 3,812,928 A | * | 5/1974 | Rockwell et al. ............ | 180/65.5 |
| 3,892,300 A | * | 7/1975 | Hapeman et al. ........... | 180/65.5 |
| 3,908,776 A | | 9/1975 | Dudley | |
| 5,163,528 A | * | 11/1992 | Kawamoto et al. ......... | 180/65.5 |
| 5,366,037 A | | 11/1994 | Richey | |
| 5,878,829 A | * | 3/1999 | Kanno et al. ............... | 180/65.5 |
| 5,920,136 A | * | 7/1999 | Schmid ......................... | 310/77 |
| 5,921,338 A | * | 7/1999 | Edmondson ................. | 180/65.5 |
| 5,924,506 A | * | 7/1999 | Perego ........................ | 180/65.5 |
| 5,996,716 A | * | 12/1999 | Montiglio et al. .......... | 180/65.5 |
| 6,050,356 A | | 4/2000 | Takeda et al. | |
| 6,057,617 A | | 5/2000 | Schmid | |
| 6,059,060 A | * | 5/2000 | Kanno et al. ............... | 180/65.8 |
| 6,220,382 B1 | * | 4/2001 | Kramer et al. ............. | 180/65.5 |
| 6,494,278 B1 | | 12/2002 | Weisz | |
| 6,540,632 B1 | * | 4/2003 | Wendl et al. ................. | 475/5 |
| 6,688,412 B1 | * | 2/2004 | Kima et al. ................. | 180/65.5 |
| 6,752,227 B1 | * | 6/2004 | Bachmann ................... | 180/65.5 |
| 6,880,654 B1 | * | 4/2005 | Plishner ....................... | 180/65.6 |
| 7,100,722 B1 | * | 9/2006 | Bowen ......................... | 180/65.5 |
| 2002/0023791 A1 | * | 2/2002 | Kima et al. ................. | 180/65.5 |
| 2004/0112656 A1 | * | 6/2004 | Bowen ......................... | 180/65.5 |
| 2004/0262060 A1 | * | 12/2004 | Kim ........................... | 180/65.5 |
| 2005/0000742 A1 | * | 1/2005 | Mulhern et al. ............ | 180/65.5 |
| 2005/0061565 A1 | * | 3/2005 | Mizutani et al. ........... | 180/65.5 |
| 2006/0144626 A1 | * | 7/2006 | Mizutani et al. ........... | 180/65.5 |

\* cited by examiner

*Primary Examiner*—J. Allen Shriver

(57) ABSTRACT

A compact and lightweight drive mechanism for an electrically powered vehicle such as a wheelchair or a scooter. The compact drive mechanism includes a gearmotor combining a motor and a gearbox. High strength rare earth magnets and a large diameter enable the motor to generate a high torque. Gearmotor efficiency is maximized by placing the motor and gearbox in a direct drive relationship, with the shafts of both motor and gearbox parallel to one another. The compact drive mechanism weighs less than conventional drive mechanisms and occupies less space. The compact drive mechanism therefore improves efficiency and lowers power requirements over conventional systems.

3 Claims, 5 Drawing Sheets

COMPACT DRIVE MECHANISM FOR ELECTRICALLY POWERED VEHICLE

FIELD OF THE INVENTION

This invention relates to drive mechanisms for powered vehicles for the disabled and specifically to an improved drive mechanism for a wheelchair or motor scooter.

BACKGROUND OF THE INVENTION

Conventional electrically powered wheelchairs are typically powered by motors connected to a separate gearbox. The typical gearbox is a right-angled gearbox. Stopping the wheelchair is accomplished by a brake, which is typically connected externally to the motor.

Since the wheelchair must be able to turn in a very tight radius, conventionally powered wheelchairs typically have two drive wheels, which can be rotated independently of one another. Each drive wheel is driven by a gearbox, which in turn is driven by a motor. A brake is typically connected to the outside of the motor. To supply power to the motors, the wheelchair is typically outfitted with one or more batteries. The batteries are typically rechargeable, so that the operator can easily recharge the batteries by simply plugging into a wall electrical outlet.

The use of two motors, two gearboxes, an external brake, and the batteries to supply power results in a great demand for space to accommodate all of these components. Typically, a portion of the frame of a conventional wheelchair is reserved for mounting of the batteries and the drive mechanism. The motor, gearbox, and external brake take up a lot of space on a convention wheelchair, leaving little space for installing batteries and other equipment. The gearboxes and motors add to the weight of the wheelchair, increasing the power drain and decreasing the charge of the batteries as the wheelchair is operated.

FIGS. 1 and 2 depict a portion of a prior art wheelchair 20 including a frame 22, drive wheels 24, batteries 26, and a drive mechanism 28. The drive mechanism 28 is a right angle gearmotor 30 comprised of a motor 32 and a gearbox 34. In powered vehicles for handicapped persons, such as wheelchairs and scooters, the vehicle must include a safety feature that stops the vehicle whenever the vehicle controller is set to the neutral position. Typically, the controller includes a joystick (not shown) that is manipulated by the wheelchair user to control the vehicle. In the conventional wheelchair, a brake 36 mounted external to the motor 32 acts as a safety brake, stopping the rotation of the drive wheels 24 at the appropriate times as the controller is placed in the neutral position. As depicted in FIGS. 1 and 2, two right angle gearmotors 30 are typically used in a wheelchair 20, one to drive each drive wheel 24. The drive wheels 24 can therefore rotate independently of one another as called for by the controller (not shown). This is to enable the wheelchair 20 to make a tight radius turn, which is necessary in the confined spaces a wheelchair must operate in.

As shown in FIGS. 1 and 2, the gearmotors 30 on a conventional wheel chair 20 are quite large in size, taking up quite a large area of space on the wheelchair frame 22. The large area occupied by the conventional gearmotors 30 is to the detriment of the runtime of the wheelchair 20, as the space occupied by the gearmotors 30 limits the size of the batteries 26 that can be accommodated on the wheelchair frame 22. As another consequence of using the conventional right angle gearmotors 30, the large size of the gearmotors 30 translates to a heavier weight further reducing the runtime of the batteries 26. Typically, the batteries 26 can be recharged from a wall outlet, and any increase in weight of the wheelchair 30 comes at an expense of a reduction in battery life and runtime.

As further depicted in FIGS. 1 and 2, the safety brake on a conventional wheelchair 20 is an external brake 36 mounted on the end of the motor 32 portion of the gearmotor 30. Mounting the brake 36 external to the gearmotor 30 further increases the length of the gearmotor 30 and takes up additional space on the frame 22 that could better be used for the batteries 26.

Thus, although the right-angled gearbox and motor with external brake are commonly used as drive mechanisms on wheelchairs, they suffer several disadvantages. Power consumption is high. A large amount of space is required to accommodate a right-angled gearbox. The right-angled gearbox and motor are fairly large, thereby adding a significant amount of weight that will consume power and reduce the efficiency of the drive mechanism.

What is needed is a drive mechanism for an electrically powered vehicle that requires less space, is of lower weight, and improves efficiency over conventional drive mechanisms.

SUMMARY OF THE INVENTION

The invention is a compact and lightweight drive mechanism for an electrically powered vehicle such as a wheelchair or a scooter. The drive mechanism includes a gearmotor combining a motor and a gearbox. Rare earth magnets and a large diameter enable the motor to generate a high torque. Gearmotor efficiency is maximized by placing the motor and gearbox in a direct drive relationship, with the shafts of both motor and gearbox parallel to one another. The drive mechanism weighs much less than conventional drive mechanisms and takes up much less space. The drive mechanism therefore improves efficiency and lowers power requirements over conventional systems.

OBJECTS AND ADVANTAGES

As a result of providing a brake that is internal to the electric motor, a first advantage is that the overall size of the electric motor is reduced as compared to a conventional motor with an external brake. A further advantage results from the reduction in the footprint or amount of space taken up by the motor and gearbox. By reducing the amount of space required, there is more room for batteries and other essential equipment.

Providing a gearmotor including an internal brake provides a further advantage in that the weight of the drive mechanism is reduced. A weight reduction decreases power drain and increases battery life.

Placement of the gearbox portion of the gearmotor within the wheel hub of the drive wheels has the advantage of creating additional space on the wheelchair frame.

By providing a direct drive between the motor portion and gearbox portion of the gearmotor, overall electrical efficiency is improved over the conventional right-angle motor and gearbox.

These and other objects and advantages of the present invention will be better understood by reading the following description along with reference to the drawings.

TABLE OF NOMENCLATURE

Figure 1:
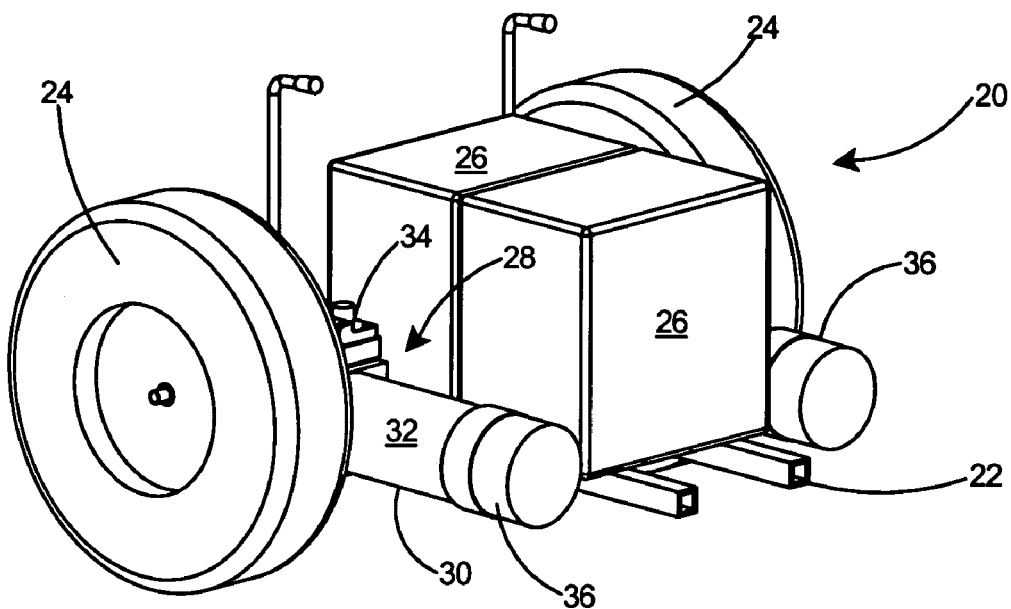
FIG. 1 is a perspective view of a prior art wheelchair.

The following is a listing of part numbers used in the drawings along with a brief description:

| Part Number | Description |
| --- | --- |
| 20 | prior art wheelchair |
| 22 | frame |
| 24 | drive wheel |
| 26 | battery |
| 28 | drive mechanism |
| 30 | right angle gearmotor |
| 32 | motor |
| 34 | gearbox |
| 36 | external brake |
| 40 | wheelchair |
| 42 | compact drive mechanism |
| 44 | frame |
| 46 | drive wheel |
| 48 | battery |
| 50 | compact gearmotor |
| 52 | motor |
| 54 | gearbox |
| 56 | wheel hub |
| 58 | gearbox shaft |
| 60 | electrical supply wiring |
| 62 | keyway |
| 64 | motor shaft |
| 66 | gear on motor shaft |
| 68 | gear on gearbox shaft |
| 70 | motor end |
| 72 | gearbox end |
| 74 | inner cavity |
| 76 | internal brake |
| 78 | compression spring |
| 80 | electromagnet |
| 82 | controller |
| 84 | friction disk |
| 86 | soleplate |
| 88 | release lever |
| 90 | rare earth magnet |
| 92 | walls of motor internal housing |

DETAILED DESCRIPTION OF THE INVENTION

The present invention is a compact drive mechanism that frees up space, reduces weight, and improves the runtime and efficiency of powered vehicles for the handicapped.

Figure 9:
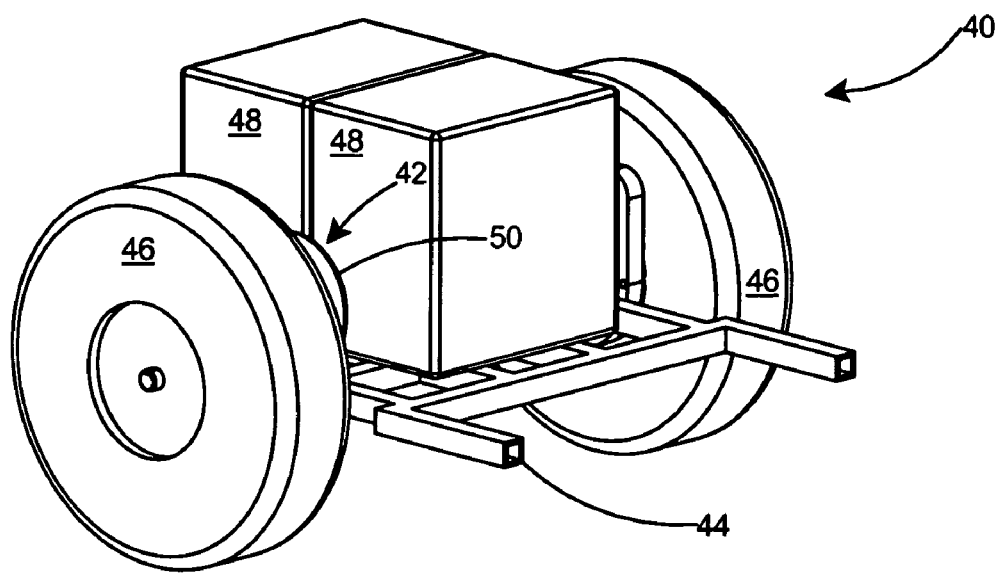
FIG. 9 is a perspective view of a wheelchair constructed with the drive mechanism according to the present invention.
Figure 10:
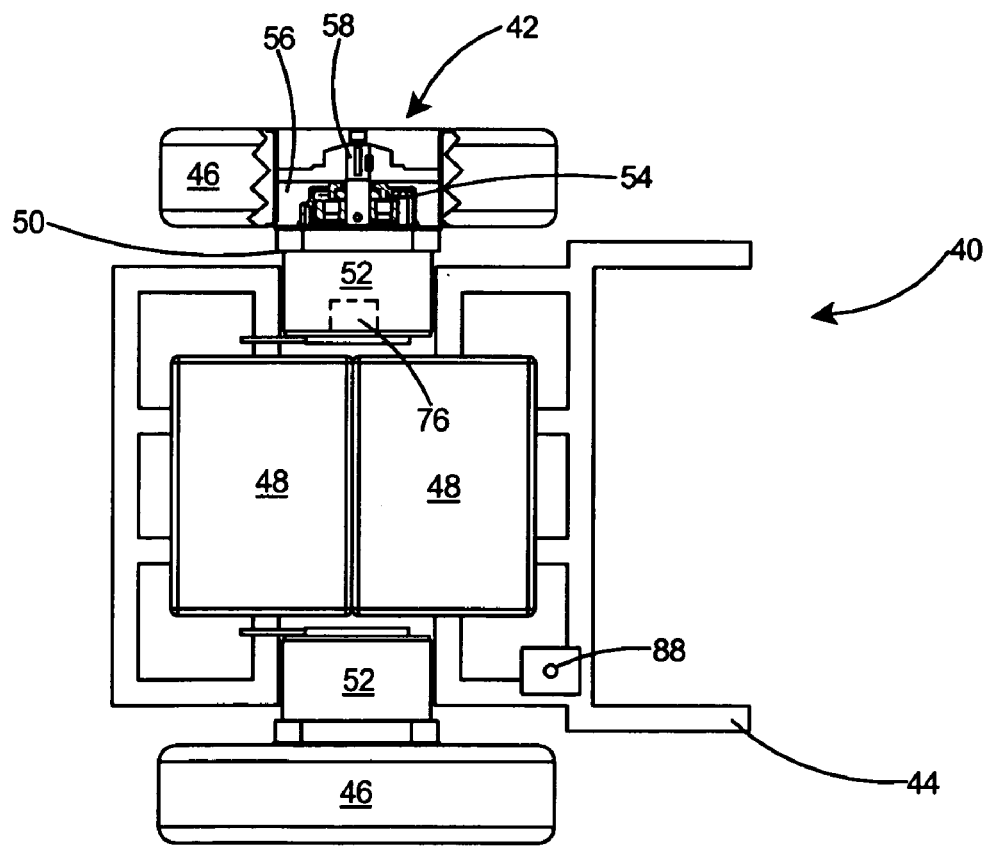
FIG. 10 is a top view of the wheelchair depicted in FIG. 9.

Referring to FIGS. 9 and 10, a portion of a wheelchair 40 is depicted with the compact drive mechanism 42 of the present invention installed thereon. The wheelchair 40 includes a frame 44, drive wheels 46, and batteries 48. Two compact gearmotors 50 according to the present invention are secured to the frame 44. The compact gearmotors 50 include a motor 52 and a gearbox 54. A portion of one drive wheel 46 is broken away to show the gearbox 54, which is disposed substantially within the wheel hub 56.

Figure 3:
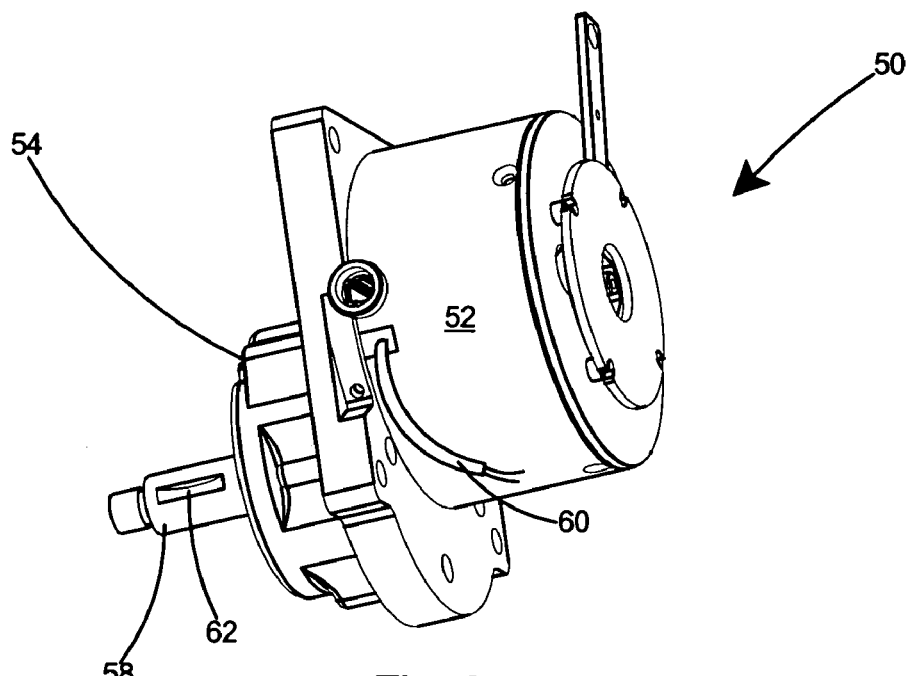
FIG. 3 is a perspective view of a gearmotor that forms part of the drive mechanism of an electrically powered vehicle according to the present invention.
Figure 4:
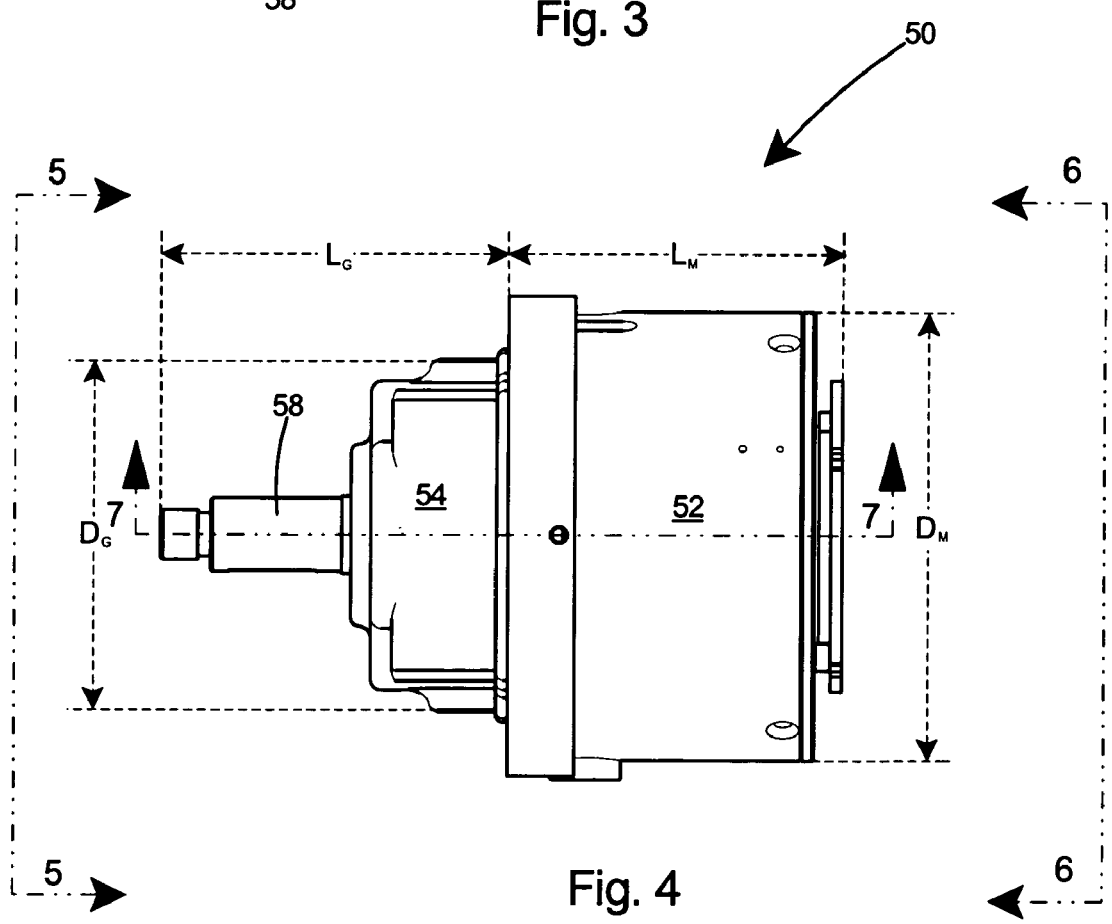
FIG. 4 is a side view of the gearmotor of FIG. 3.
Figure 5:
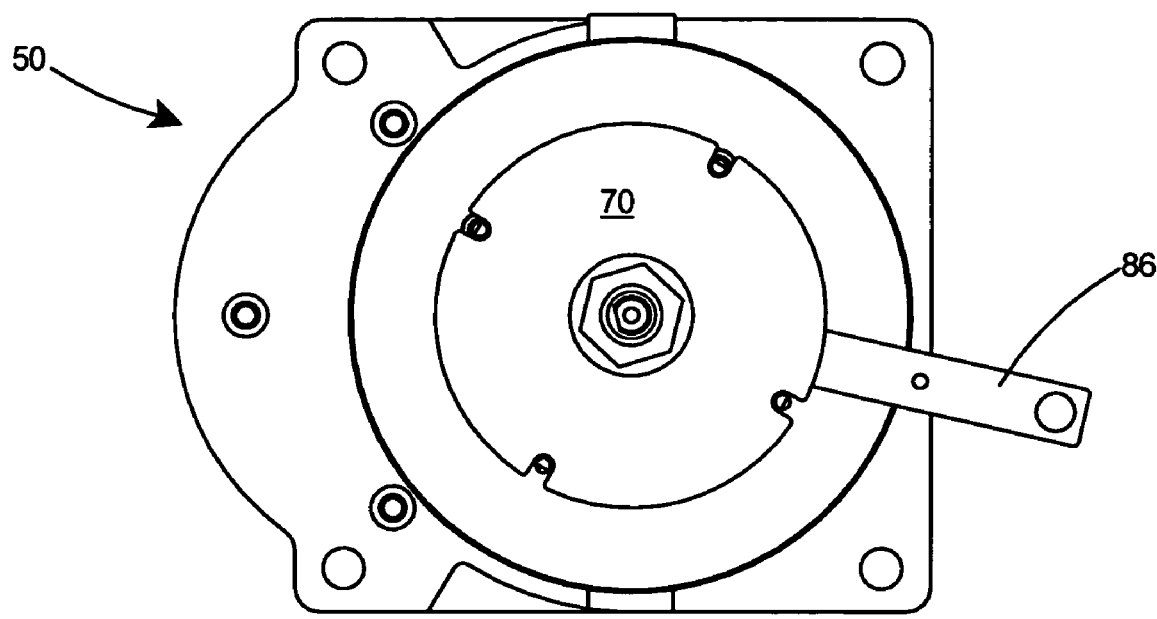
FIG. 5 is a first end view of the gearmotor taken along line 5—5 of FIG. 4.
Figure 6:
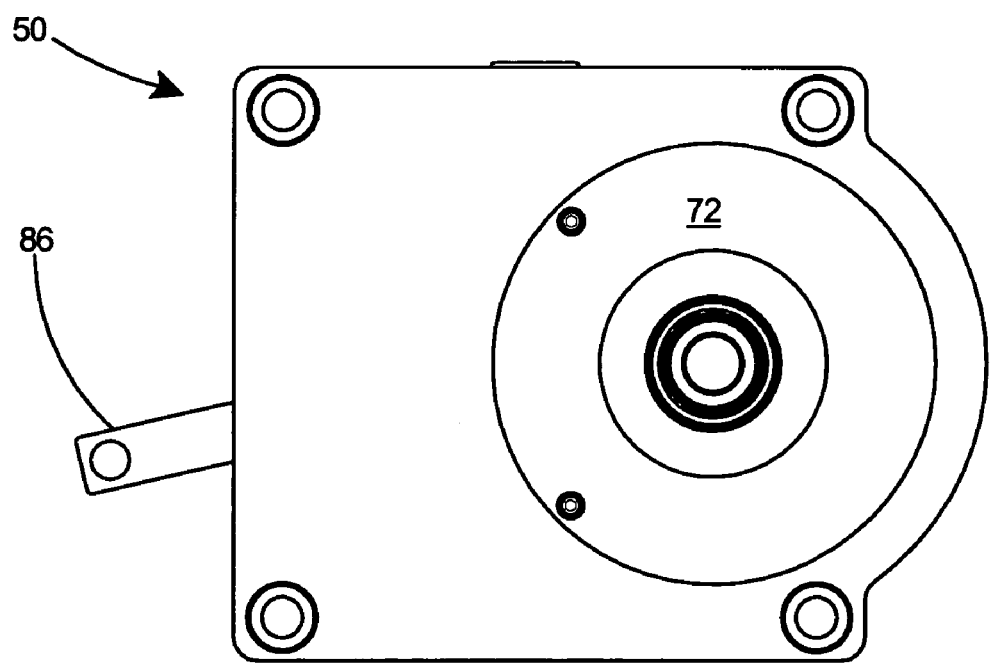
FIG. 6 is a second end view of the gearmotor taken along line 6—6 of FIG. 4.

As shown in FIGS. 3 and 4, the motor 52 and gearbox 54 are joined integrally into a compact gearmotor 50. A gearbox shaft 58 extends from the gearbox. Electrical current is provided through electrical supply wiring 60 to power the motor 52 and the gearbox 54 reduces the speed of the motor to an appropriate speed for driving the drive wheels (not shown) of the electrically powered vehicle through a direct drive linkage. A keyway 62 is provided on the gearbox shaft 58 for keyed connection to the drive wheel.

Figure 7:
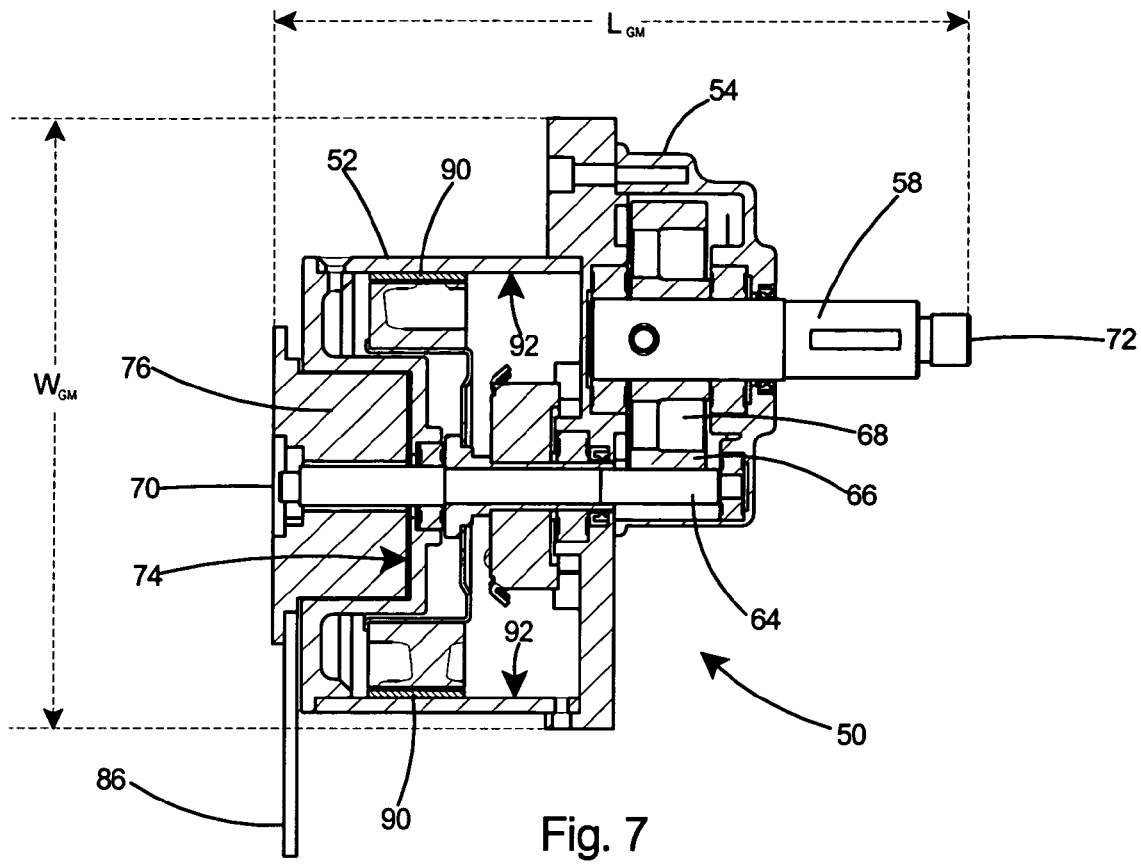
FIG. 7 is a sectional view of the gearmotor taken along line 7—7 of FIG. 4.

As shown in FIG. 7, a sectional view of the compact gearmotor 50 taken along line 7—7 of FIG. 4, the gearmotor 50 is a direct drive gearmotor, with the gearbox shaft 58 parallel to the motor shaft 64. A gear 66 on the motor shaft 64 engages a gear 68 on the gearbox shaft 58. The gearmotor 50 includes a motor end 70 and a gearbox end 72. The motor end 70 of the compact gearmotor 50 includes an inner cavity 74 surrounding the motor shaft 64. A brake 76 is mounted within the inner cavity 74 of the motor 52 and is therefore an internal brake 76. To improve efficiency of the compact gearmotor 50, gear 66 on the motor shaft 64 is preferably a helical gear and the gear 68 on the gearbox shaft 58 is preferably a helical gear.

Figure 8:
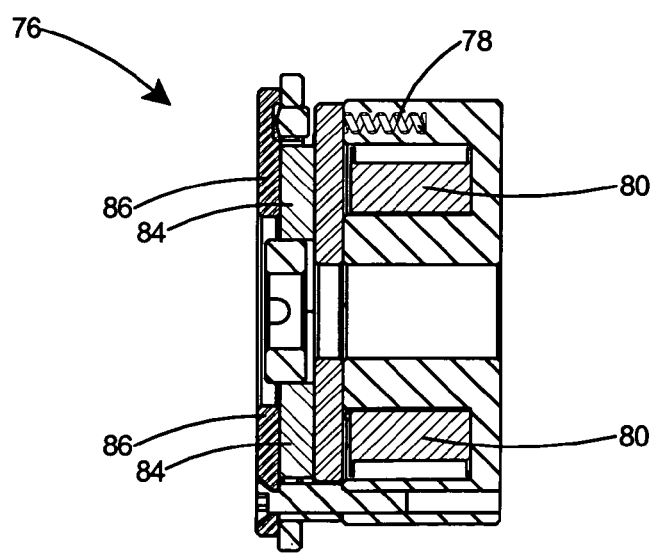
FIG. 8 is a sectional view of the brake portion of the gearmotor of FIG. 3.

With reference to FIG. 8, the internal brake 76, which is contained completely inside the motor 52, is a friction brake including a compression spring 78, an electromagnet 80, a friction disk 84, a soleplate 86, and a release lever 88. The compression spring 78 biases the brake 76 to the brake applied state and the electromagnet 80 when activated releases the brake 76.

With reference to FIG. 10, the compact drive mechanism 42 or gearmotor 50 of the present invention is secured to the frame 44 of a wheelchair 40 or other electrically powered vehicle. The gearbox shafts 58 are secured to the respective wheel hubs 56 of the drive wheels 46. The gearboxes 54 of the compact gearmotors 50 are each disposed substantially within their respective wheel hub 56. The internal brake 76, depicted by dashed lines, is within the motor 52.

Typically a controller 82 is provided to enable an operator to control the speed and direction of rotation of the gearmotors 50. The controller 82 typically includes a run and a stop state. When the controller 82 is placed in the run state, the electromagnet 80 (see FIG. 8) is activated electrically thereby pulling the friction disk 84 away from the soleplate 86 and releasing the brake 76. In the run state, at the same time that the internal brake 76 is released, the controller 82 causes rotation of the drive wheels 46. Placing the controller 82 in the stop state cuts power to the electromagnet 80 thereby enabling the compression spring 78 to force the friction disk 84 against the soleplate 86 and apply the brake 76 to stop rotation of the drive wheels 46. Operation of the present invention is therefore controlled automatically by an operator who manipulates the controller 82. As a safety feature, whenever the controller 82 is placed in the stop state, the brake's electromagnet 80, see FIG. 8, is electrically deactivated and the internal brake 76 is applied. The electric motor 52 also includes a manual brake release lever 88 for releasing the internal brake 76 manually when desired, such as when the wheelchair 40 is powered down and it is desired to release the brake for example when the wheelchair 40 is being pushed by a person from one location to another.

In an especially preferred embodiment of the compact drive mechanism 42 of the present invention, the motor 52 is a 24 volt DC motor with a speed of rotation preferably between 2,000 and 5,000 rpm. The compact drive mechanism 42 preferably has a step down ratio in speed of rotation of between 50:1 and 8:1. For a 3,000-rpm motor, the gearbox 54 therefore gears the motor down to drive the gearbox shaft 58 at a speed of rotation of between 60 and 375 rpm, depending on the selection of gearbox ratio.

Referring to FIG. 7, a key advantage of the compact drive mechanism 42 is that the motor 52 is a direct-drive motor. By placing the motor 52 and gearbox 54 in a direct drive relationship, with the gearbox shaft 58 and motor shaft 64 parallel to one another, the efficiency of the gearmotor 50 is maximized and much improved over the right angle drives of conventional motor and gearbox drives.

Figure 2:
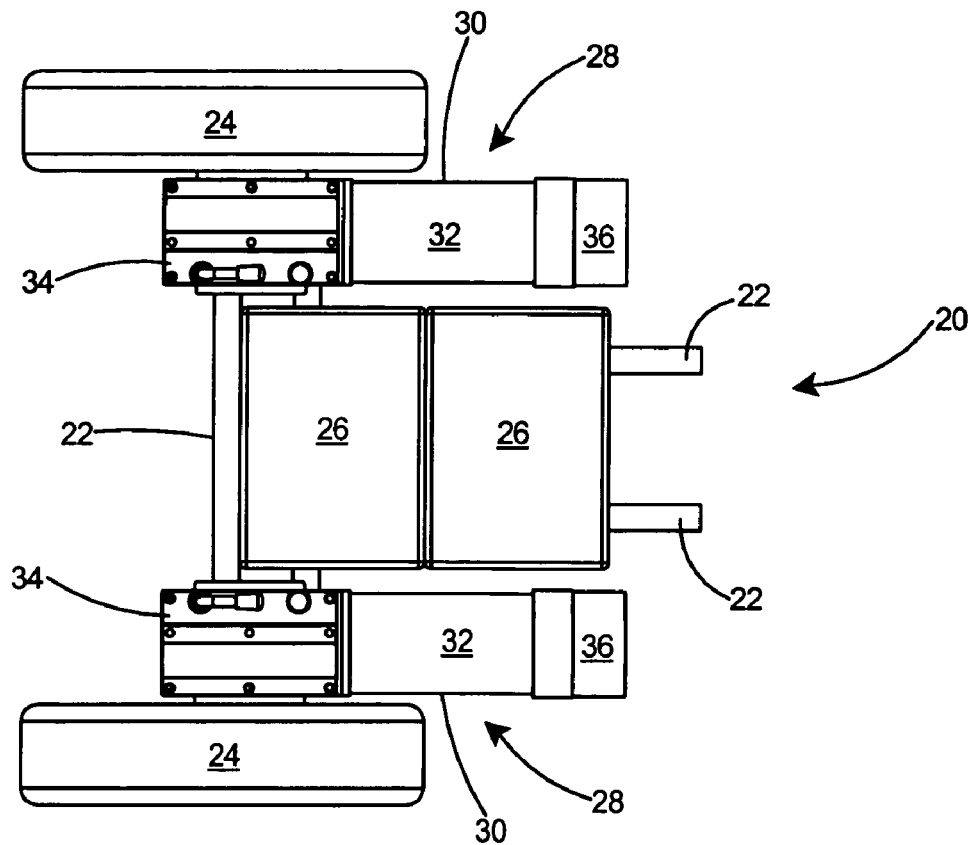
FIG. 2 is a top view of the prior art wheelchair of FIG. 1.

A second key advantage of the compact drive mechanism 42 is that the brake 76 is an internal brake, situated within the motor 52. By placing the brake 76 within the motor 52, as shown in FIG. 7, the overall length of the motor 52, as compared to a conventional motor 32 having an external brake 36 (see FIG. 2), is decreased, allowing significant savings in space on the frame of the electrically powered vehicle. As shown in FIG. 4, the outer diameter ($D_M$) of the motor 52 is no greater than 4.5" and the length ($L_M$) of the motor 52 is no greater than 3.125". Although the motor 52 of the present invention is much smaller in length than a conventional motor, the larger diameter and use of rare earth magnets 90 in the motor 52 on the walls 92 of the internal housing enable the motor 52 to develop the high torque that is typically required for an electrically powered vehicle for the handicapped. The motor 52 of the present invention has a nominal power rating of at least ¼ horsepower.

A shown in FIG. 10, another key advantage of the compact drive mechanism 42 is the compact size of the gearbox 54. As a result of the reduced size of the gearbox, additional frame space is freed up by disposing the gearbox 54 of the compact gearmotor 50 substantially within the wheel hub 56 of the wheelchair 40. As shown in FIG. 4, the outer diameter ($D_G$) of the gearbox 54 is no greater than 3.75" and the length ($L_G$) of the gearbox 54 is no greater than 4".

With reference to FIG. 7, the overall width ($W_{GM}$) of the compact gearmotor 50 is no greater than 6.125" and the overall length ($L_{GM}$) of the compact gearmotor 50 is no greater than 7.25".

The compact drive mechanism 42 of the present invention can be used with any electrically powered vehicle for the handicapped, such as a wheelchair or a scooter. For an electrically powered wheelchair according to the present invention, as shown in FIGS. 9 and 10 herein, the compact drive mechanism 42 would typically include two drive wheels 24 and two compact gearmotors 50, one compact gearmotor to power each drive wheel. Since a scooter is not required to make sharp turns, typically one wheel is driven, and a scooter according to the present invention would typically include one compact gearmotor connected to a transaxle (not shown) to drive one of the wheels.

Having thus described the invention with reference to a preferred embodiment, it is to be understood that the invention is not so limited by the description herein but is defined as follows by the appended claims.

What is claimed is:

1. A compact drive mechanism for an electrically powered vehicle comprising:
   a frame;
   a gearmotor secured to said frame;
   said gearmotor including a motor, a gearbox, and a gearbox shaft extending from said gearbox;
   a brake within said motor, said brake including a brake applied state and a brake released state;
   a spring biasing said brake to said brake applied state;
   an electromagnet for placing said brake in said brake released state;
   a drive wheel secured to said shaft;
   a wheel hub extending from said drive wheel and surrounding said shaft;
   said gearbox of said gearmotor disposed substantially within said wheel hub;
   a controller for controlling the speed and direction of rotation of said gearmotor; and
   said controller including a first and a second state;
   whereby placing said controller in said first state activates said electromagnet thereby releasing said brake and allowing rotation of said drive wheel and placing said controller in said second state deactivates said electromagnet thereby applying said brake to stop rotation of said drive wheel.

2. The compact drive mechanism of claim 1 wherein said motor is a direct-drive motor.

3. The compact drive mechanism of claim 2 wherein
   said motor includes a motor shaft having a helical gear thereon;
   said gearbox shaft includes a helical gear thereon;
   said motor shaft is parallel with said gearbox shaft; and
   said gear on said motor shaft intermeshes with said gear on said gearbox shaft.

* * * * *